Patented June 20, 1933

1,914,674

UNITED STATES PATENT OFFICE

FRANZ RUNGE, OF HEIDELBERG, AND MARTIN MUELLER-CUNRADI, OF LUDWIGS-HAFEN-ON-THE-RHINE, GERMANY, ASSIGNORS TO I. G. FARBENINDUSTRIE AKTIEN-GESELLSCHAFT, OF FRANKFORT-ON-THE-MAIN, GERMANY

PROCESS FOR THE CONVERSION OF BUTENE-1 INTO BUTENE-2

No Drawing. Application filed September 23, 1931, Serial No. 564,728, and in Germany January 22, 1930.

The present invention relates to the conversion of butene-1 into butene-2.

We have found that butene-1 or gases comprising butene-1 can be readily converted into butene-2 by heating them to a temperature of between 400° and 600° C. and preferably to a temperature not exceeding 575° C.

By employing catalysts, the temperature of the reaction under otherwise like conditions may be lowered. For example temperatures of between 400° and 500° C. may be employed in this case. Catalysts particularly suitable for employment according to the present invention are substances which have a non-acid reaction, that is to say a neutral or alkaline reaction, against litmus when treated with water. As example of such substances may be mentioned metal oxides and in particular difficultly reducible metal oxides and neutral salts, for example neutral salts of boric acid, phosphoric acid or of silicic acid.

The gases undergoing treatment are preferably passed through the reaction zone at a rate of between about 25 and 250 litres hourly per litre of reaction space and most advantageously at a rate of about 100 litres per hour per litre of reaction space.

The process is preferably carried out under atmospheric pressure, but somewhat reduced or elevated pressure may also be employed.

In order to prevent too fargoing conversion it may in some cases prove desirable to add inert gases or vapors. Such gases may also already be contained in the initial gases comprising butene-1. As examples of such gases may be mentioned nitrogen, carbon monoxide, carbon dioxide, ethane, methane or propane. The butene-1 may be derived from any desirable source, and may for example be obtained by dehydrogenation of butane or gases containing butane.

The following examples will further illustrate how the present invention may be carried out in practice, but the invention is not restricted to the said examples.

Example 1

Butene-1 is passed through an empty quartz tube which is maintained at a temperature of about 550° C. The effluent gas contains 87 per cent by volume of butene-2 besides butene-1. About 2 per cent of the initial materials are converted into liquid polymerization products.

Example 2

Butene-1 is passed through a porcelain tube which is filled with pieces of calcium oxide, and which is heated to about 420° C. Besides small amounts of polymerization products the effluent gases contain about 92 per cent of butene-2. Isobutylene is not formed in this conversion.

Example 3

Butene-1 is passed through a layer of a finely ground catalyst consisting of aluminium phosphate deposited on pumice stone. The butene-1 is rearranged into butene-2 almost quantitatively. In the said example bauxite may also be employed as a catalyst.

What we claim is:—

1. A process for the conversion of butene-1 into butene-2, which comprises heating butene-1 to a temperature of between 400° and 600° C.

2. A process for the conversion of butene-1 into butene-2, which comprises heating butene-1 to a temperature of between 400° and 575° C.

3. A process for the conversion of butene-1 into butene-2, which comprises heating butene-1 to a temperature of between 500° and 600° C. in the absence of a catalyst.

4. A process for the conversion of butene-1 into butene-2, which comprises heating butene-1 to a temperature of between 500° to 575° C. in the absence of a catalyst.

5. A process for the conversion of butene-1 into butene-2, which comprises heating butene-1 to a temperature of between 400° and 600° C. in the presence of a catalyst of the group consisting of neutral salts of boric acid, phosphoric acid and silicic acid.

6. A process for the conversion of butene-1 into butene-2, which comprises heating butene-1 to a temperature of between 400° and 500° C. in the presence of calcium oxide as catalyst.

7. A process for the conversion of butene-1 into butene-2, which comprises heating butene-1 to a temperature of between 400° and 500° C. in the presence of a catalyst of the group consisting of the neutral salts of boric acid, phosphoric acid and silicic acid.

8. A process for the conversion of butene-1 into butene-2, which comprises passing butene-1 through a zone maintained at a temperature of about 550° C.

9. A process for the conversion of butene-1 into butene-2, which comprises passing butene-1 over calcium oxide heated to a temperature of about 420° C.

10. A process for the conversion of butene-1 into butene-2, which comprises passing butene-1 over aluminium phosphate, deposited on pumice stone, and heated to a temperature of about 400° C.

In testimony whereof we have hereunto set our hands.

FRANZ RUNGE.
MARTIN MUELLER-CUNRADI.